US012704047B2

(12) United States Patent
Chochua et al.

(10) Patent No.: US 12,704,047 B2
(45) Date of Patent: Aug. 11, 2026

(54) DOWNHOLE LOW-THRUST POWER GENERATION TURBINE AND METHOD FOR POWER GENERATION

(71) Applicant: Schlumberger Technology Corporation, Sugar Land, TX (US)

(72) Inventors: Gocha Chochua, Sugar Land, TX (US); Christopher Rowe, Stonehouse (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 51 days.

(21) Appl. No.: 18/930,462

(22) Filed: Oct. 29, 2024

(65) Prior Publication Data

US 2026/0117626 A1 Apr. 30, 2026

(51) Int. Cl.
*E21B 41/00* (2006.01)
*F01D 15/10* (2006.01)

(52) U.S. Cl.
CPC .......... *E21B 41/0085* (2013.01); *F01D 15/10* (2013.01); *F05D 2220/76* (2013.01)

(58) Field of Classification Search
CPC ... E21B 41/0085; F01D 15/10; F05D 2220/76
USPC ........................................................... 290/52
See application file for complete search history.

(56) References Cited

U.S. PATENT DOCUMENTS

| | | | | |
|---|---|---|---|---|
| 1,576,653 A * | 3/1926 | Hanson | F01D 25/16 | 415/199.5 |
| 6,763,899 B1 | 7/2004 | Ossia | | |
| 7,133,325 B2 * | 11/2006 | Kotsonis | H02K 7/1823 | 175/48 |
| 2005/0012340 A1 * | 1/2005 | Cousins | E21B 41/0085 | 290/52 |
| 2005/0139393 A1 * | 6/2005 | Maurer | E21B 41/0085 | 175/57 |
| 2014/0251592 A1 * | 9/2014 | Chen | E21B 47/20 | 166/66.5 |

FOREIGN PATENT DOCUMENTS

CN 116498475 A * 7/2023 .............. F03B 13/02

* cited by examiner

*Primary Examiner* — Charles Reid, Jr.
(74) *Attorney, Agent, or Firm* — Kyle R. Miiller

(57) ABSTRACT

Aspects presented provide for a low-cost downhole generation turbine. In embodiments, the downhole power generation turbine is configured to minimize the effects of thrust that may be present in the downhole environment, thereby increasing the service life of the downhole power generation turbine. A method of generating an electric current in a downhole turbine generator includes accepting a fluid flow into an inlet of a tubular shape, transmitting the fluid flow through the tubular shape, wherein the fluid flow passes through a fluid flow passage formed by a stator assembly and a rotor assembly, wherein the rotor assembly is configured to spin, wherein the stator and the rotor assemblies are configured such that essentially all thrust loads generated by the fluid flow are transmitted to the stator assembly, actuating an alternator package through connection to the rotor assembly, and producing the electric current through the actuation of the alternator package.

20 Claims, 6 Drawing Sheets

DOWNHOLE LOW-THRUST POWER GENERATION TURBINE AND METHOD FOR POWER GENERATION

CROSS-REFERENCE TO RELATED APPLICATIONS

None.

FIELD OF THE DISCLOSURE

Aspects of the disclosure relate to turbine technology. More specifically, aspects of the disclosure relate to a low-thrust, downhole, power generation turbine that may be used in hydrocarbon recovery operations.

BACKGROUND

Hydrocarbons are organic compounds that consist of hydrogen and carbon atoms. Hydrocarbons are widely used as fuels, lubricants, plastics, solvents, and other products by various sectors of society and industry. The availability of hydrocarbons is not unlimited. Over time, the large and easily accessible hydrocarbon fields have been depleted or exploited to a significant extent, leaving behind smaller and more difficult fields that require more advanced and costly techniques to develop.

One of the challenges that face the development of these fields is the depth of the reservoirs. Some hydrocarbon fields are located in deep or ultra-deep water, where conventional drilling and production methods are not feasible or economical. Others are located in deep underground formations, where high temperatures and pressures pose technical and operational difficulties. These conditions require specialized equipment and materials that can withstand the harsh environment and deliver reliable performance.

One of the pieces of equipment that is used in such applications is the downhole turbine. A downhole turbine is a device that converts the kinetic energy of a fluid flow into rotational mechanical energy, which is then converted into electrical energy by a generator. The fluid flow is due to the circulating mud from the surface pumps which also provides cuttings cleanup, and bottom hole assembly and drilling bit cooling. The electrical energy can be used to power various downhole tools, such as pumps, compressors, generators, and/or drill bits. Downhole turbines offer several advantages over other types of downhole power sources, such as batteries. They are simpler, more robust, more efficient, and more adaptable to different flow rates and pressures.

The commodity price of oil is not constant. Prices fluctuate over time due to various factors, such as supply and demand, geopolitics, environmental regulations, and market speculation. As the global demand for oil increases, the supply from conventional sources decreases, leading to higher prices. This creates an incentive for developing more challenging and marginal fields that were previously considered uneconomical. On the other hand, when the demand for oil decreases, the supply from conventional sources increases, leading to lower prices. This reduces the profitability and viability of developing the more challenging and marginal fields. The economic feasibility of these fields depends largely on the oil price cycle and the cost-effectiveness of the technologies and methods used to exploit them. Since the economic feasibility of different fields varies, the overall economic costs associated with maintenance of all downstream components are reduced as much as possible. Breakdown of components such as downhole turbine generators can be extremely costly.

The field of downhole turbine technology is constantly evolving to meet the needs and challenges of the hydrocarbon industry. While downhole turbines provide a valuable solution for downhole power generation, they also have some drawbacks that limit their performance and durability. One of the major drawbacks is the thrust load that is generated by the fluid flow on the turbine blades. The thrust load is a force that acts along the axis of rotation of the turbine and tends to push the rotor toward one end of the shaft. This force can cause excessive wear, friction, heat, vibration, and damage to the bearings, seals, and other components of the turbine. The thrust load can vary significantly depending on the flow rate, pressure, density, viscosity, and composition of the fluid, as well as the design and geometry of the turbine blades.

There is a need to provide an apparatus and methods that are easy to operate and that have the ability to withstand thrust loads that conventional apparatus and methods find challenging.

There is a further need to provide apparatus and methods that do not have the drawbacks discussed above, namely premature breakage of downhole turbine components due to thrust conditions.

There is a still further need to reduce economic costs associated with operations and apparatus described above with conventional tools by using a new technology that will withstand thrust conditions.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a downhole power generation turbine is disclosed. The turbine may comprise a tube with an inlet and an outlet, the tube defining an interior space. The turbine may also comprise a rotor assembly configured within the interior space. The turbine may also comprise a bearing package connected to the rotor assembly configured within the interior space. The turbine may also comprise a stator assembly configured around the rotor assembly and within the interior space, wherein the rotor assembly is configured to rotate within the stator assembly, and wherein the rotor assembly and the stator assembly form a fluid pathway such that fluid may progress from the inlet to the outlet and that during the progression of the fluid from the inlet to the outlet, mechanical energy of the fluid causes the rotor assembly to rotate, and wherein the stator assembly is physically separated from the rotor assembly so a pressure drop that develops from the fluid passing through the rotor assembly and stator assembly does not contribute to an axial thrust force on the bearing package. The turbine may also comprise an alternator package connected to the rotor assembly, the alternator configured to produce an electrical current.

In another example embodiment, a downhole power generation turbine is disclosed. The turbine may comprise a tube with an inlet and an outlet, the tube defining an interior space. The turbine may also comprise a rotor assembly configured within the interior space. The turbine may also comprise a bearing package connected to the rotor assembly configured within the interior space. The turbine may also comprise a stator assembly configured around the rotor assembly, the stator assembly configured with a first stage stator and a second stage stator and wherein the first stage stator is configured to accept all pressure drops across the turbine and wherein the rotor assembly and the stator assembly form a fluid pathway such that fluid may progress from the inlet to the outlet and that during the progression of the fluid from the inlet to the outlet mechanical energy of the fluid causes the rotor assembly to rotate, and wherein the stator assembly is physically separated from the rotor assembly.

In another example embodiment, a method of generating an electric current in a downhole turbine generator is disclosed. The method may include accepting a fluid flow into an inlet of a tubular shape. The method may also include transmitting the fluid flow through the tubular shape, wherein the fluid flow passes through a fluid flow passage formed by a stator assembly and a rotor assembly, wherein the rotor assembly is configured to spin, wherein the stator assembly and the rotor assembly are configured such that essentially all thrust loads generated by the fluid flow are transmitted to the stator assembly. The method may also include actuating an alternator package through connection to the rotor assembly. The method may also include producing the electric current through the actuation of the alternator package.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1:
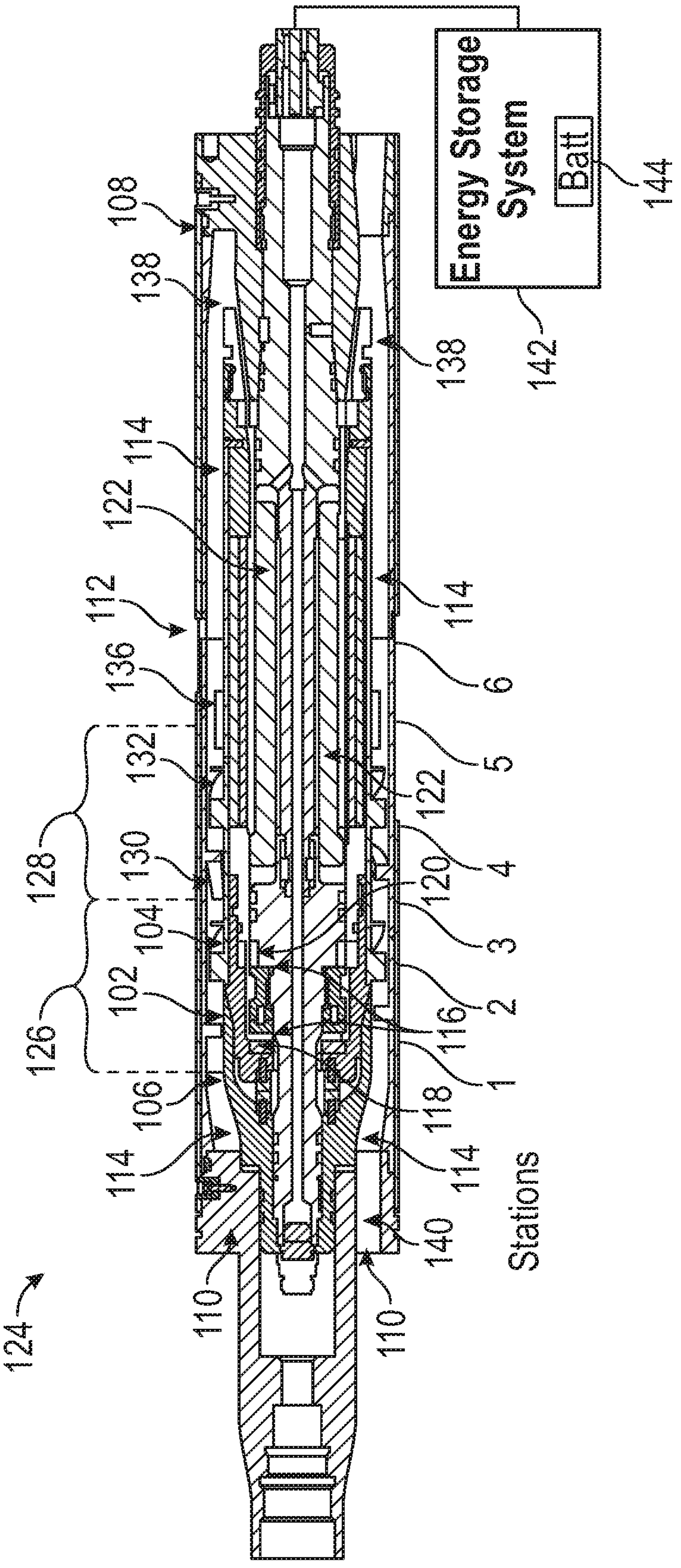
FIG. 1 is a cross-section of a low-thrust turbine configuration in accordance with one example embodiment of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers, and/or sections, these elements, components, regions, layers, and/or sections should not be limited by these terms. These terms may be only used to distinguish one element, components, region, layer, or section from another region, layer, or section. Terms such as "first", "second", and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

When an element or layer is referred to as being "on", "engaged to", "connected to", or "coupled to", another element or layer, it may be directly on, engaged, connected, or coupled to the other element or layer, or interleaving elements or layers may be present. In contrast, when an element is referred to as being "directly on", "directly engaged to", "directly connected to", or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Embodiments described herein provide a downhole turbine. A downhole turbine generator is a hydraulic turbine machine designed to operate in hydrocarbon recovery operations. Such downhole turbine generators convert the pressure energy of the flowing medium in the drill string into mechanical and then electrical energy. The electrical energy is used to power downhole electrical equipment. These generators; however, have a relatively short lifespan and often experience malfunctions, such as bearing damage. The maintenance cycle for existing downhole turbine generators is several hundred hours, which is significantly shorter than that of conventional large generators. This highlights the contradiction between the lifespan of downhole turbine generators and the demand for reliable downhole power requirement.

The rotor bearing system of downhole turbine generators is subjected to complex internal and external excitation, including hydraulic and electromagnetic excitation. Simultaneously, manufacturing defects in rotating components, material irregularities, as well as the challenging working environment of the generator contribute to failures. Such failures are due to an inevitable mass unbalance along the rotor. Under the influence of complex internal and external excitation, the bearings experience additional dynamic loads. The generator's lifespan is deeply rooted in these loads.

As the drilling mud passes through stationary blade rows, the drilling mud generates an angular momentum, or flow swirl, at the expense of the pressure drop. The downstream rotating blade rows, or rotor, convert that angular momentum, as well as its pressure drop, into the shaft power, supplying it to the alternator.

The alternator, also known as a generator, typically operates in oil separated from the turbine by a face seal. Any oil pressure generated in this configuration is compensated for by mud pressure. The oil pressure is kept at levels above the mud pressure to ensure that mud containing abrasive particles do not break through the face seal. The amount of oil within the alternator dictates the time the turbine can operate. After the oil is compromised by use, heat, and the environment, servicing of the generator is required.

In many cases, the face seal can break due to overheating, resulting in mud invasion and leading to power generation module failure. Other types of breakage may occur as well, limiting the overall usage of the power generation turbine.

An alternative to the generator configuration described above is the Mud-Lubricated Alternator (MLA). The MLA includes mud-lubricated bearings manufactured from hard materials, such as Polycrystalline Diamonds (PCD), capable of withstanding abrasive slurries. The absence of the oil loop simplifies the overall design of the MLA configuration and reduces MLA costs compared to generator configurations.

The MLA design has limitations on the axial thrust and pressure drop that the design may handle. The axial thrust capabilities are limited by temperature rise in the bearings and any parasitic torque that is generated. Due to the MLA design, a portion of mud flows in the alternator rotor/stator gap due to a pressure drop. This configuration allows for the mud to cool the alternator rotor/stator gap. In the case of excessive bypass flow driven by a high pressure drop, the turbine power output decreases. This turbine power output is considered a drawback to this design.

Embodiments of the design herein overcome the limitation of the MLA design. In the MLA design, there are two components of the rotor's axial load: the rotor blade thrust force and the hub thrust force. In embodiments, the rotor blade thrust force is driven by the pressure drop across the rotor blades acting on the rotor blades. The hub thrust force is driven by the pressure drop across the entire flow kit acting on the rotor body. The pressure drop across a turbine stage, Δp, is related to the extracted maximum turbine power, Pmax, flow rate Q, and efficiency as follows.

$$\Delta p = P_{max}/(Q \cdot \eta)$$

For a given turbine power and flow rate, the overall pressure drop can only be controlled by the turbine efficiency.

There are two different configurations for turbines in the example embodiments. One configuration is called a 50 percent reaction turbine, as described herein as 50 percent of the overall pressure drop that is split between the stator and the rotor. The other configuration is a zero reaction turbine (also known as an impulse turbine). In the impulse turbine configuration, the first stage stator has all of the pressure drop, and no pressure drop occurs across the rotor section.

In embodiments, the stator can be separated upstream of the alternator assembly so the pressure drop does not contribute to a rotor axial thrust force. Also, the first stage stator radial gap 106, which is needed between stationary and rotational components, can be removed, contributing to the overall turbine efficiency improvement. Such a configuration is illustrated in FIG. 1. As will be understood, the stator 102 and the rotor 104 are placed within a tube 108, such as a pipe, with an inlet 110 and an exit 112. The combination of the components of the stator and the rotor define a flowpath that channels the fluid and associated energy with the fluid. A bearing package 116 having a first half 120 of the bearing package 116 and a second half 118 of the bearing package 116 and an alternator package 122 may also be configured within the tube 108.

Figure 2:
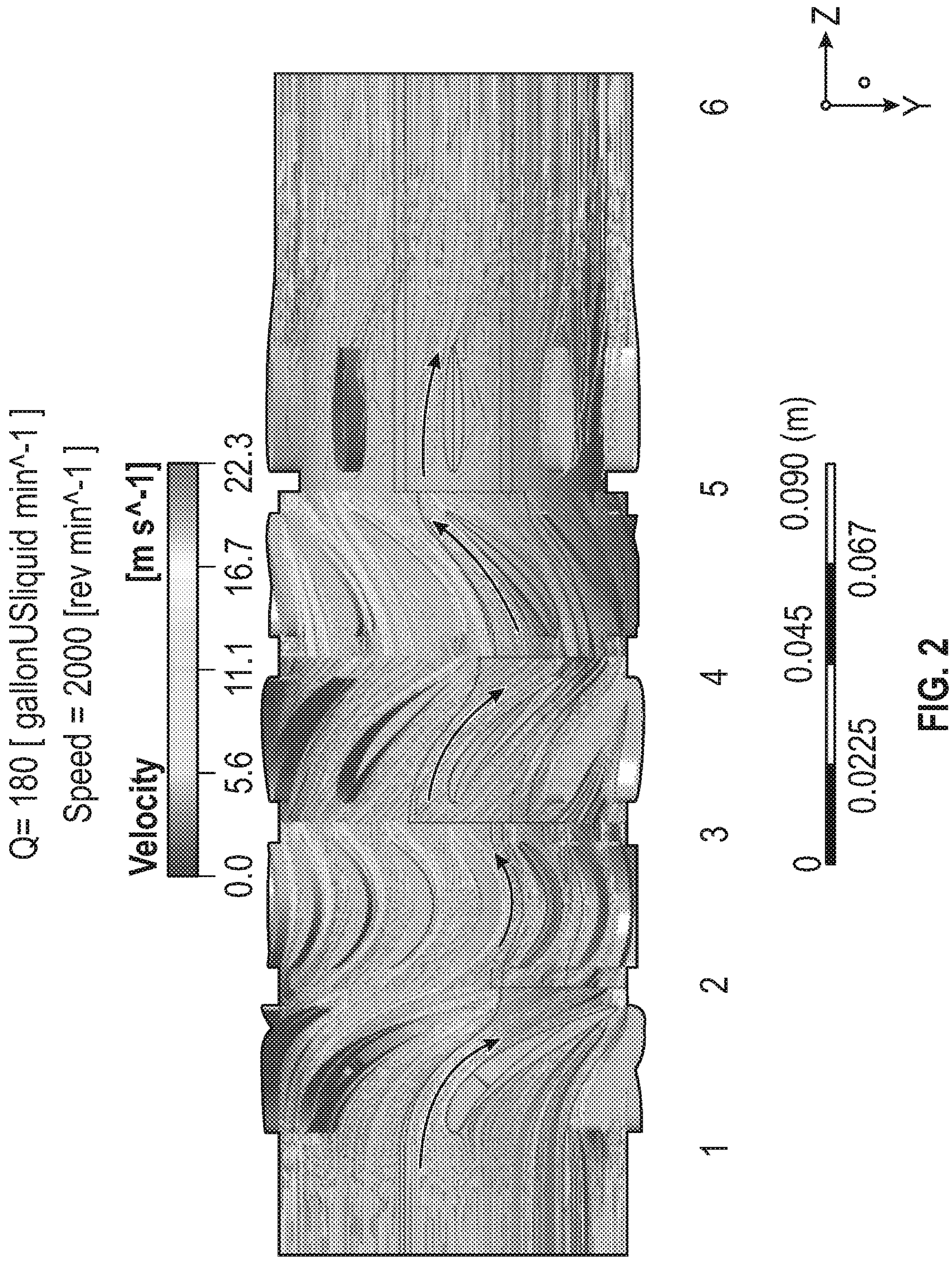
FIG. 2 is a graph of streamlines of a low-thrust turbine configuration.
Figure 3:
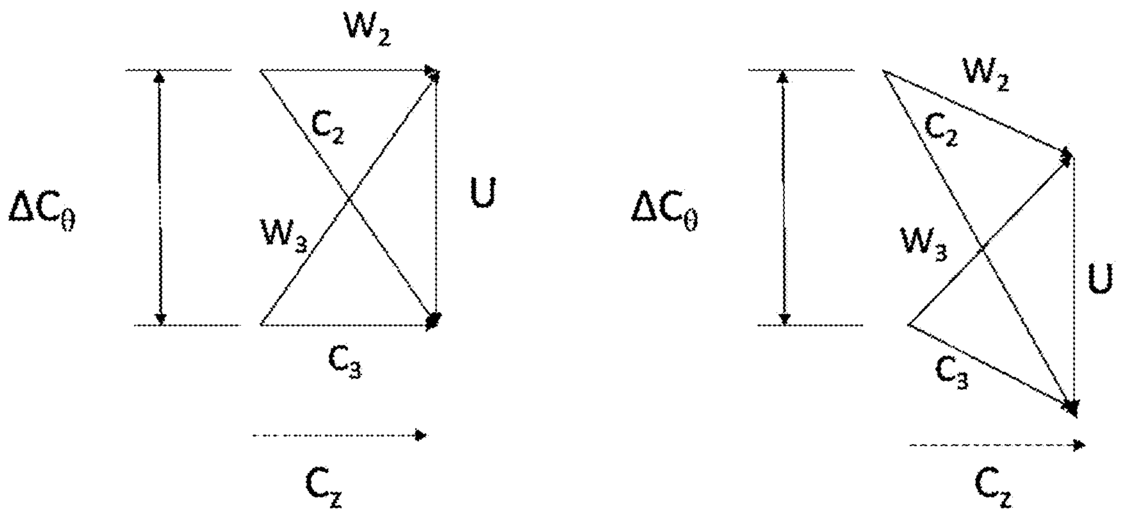
FIG. 3 is a graph of velocity triangles for the 50 percent reaction stage (left) and near zero reaction stage (right).

In one embodiment of the disclosure, FIG. 2 shows a two-stage turbine 124, with the first stage 126 being a near-zero reaction (impulse) and the second stage 128 closer to the 100 percent reaction stage. A flow straightener 136 at the exit 112 reduces any swirl that the turbine generates in order to protect the downstream components from erosion. The stations are numbered from 1 at the turbine inlet to 6 at the straightener inlet, thereby showing a progression along the arrangement. This numbering is consistent throughout the FIGS. presented. As can be seen, according to the flow experienced, FIG. 3 shows the velocity triangle plot for a stage operating at the nominal rotational speed of U and producing a power stage work ratio:

$$\frac{W_T}{U^2} = \frac{\Delta h_0}{U^2} = \frac{C_{\theta 2} - C_{\theta 2}}{U}$$

The 50 percent reaction stage is characterized by uniform absolute, C, and relative, W, velocities, which are desirable for erosion mitigation. For a near-zero reaction turbine, the velocity exiting the stator, $C_2$, is dominant. Also, the absolute velocity vector exiting the first stage rotor, $C_3$, has a swirl component that propagates to downstream stages.

As can be seen, the second stage stator 130 requires only a minor pressure drop to add swirl. This can be considered a guide vane row to mitigate the turbine's free spin. The second stage rotor 132 induces nearly all the stage's pressure drop to extract the work from the residual swirl, which makes the second stage 128 a near 50-100 percent reaction.

Figure 4:
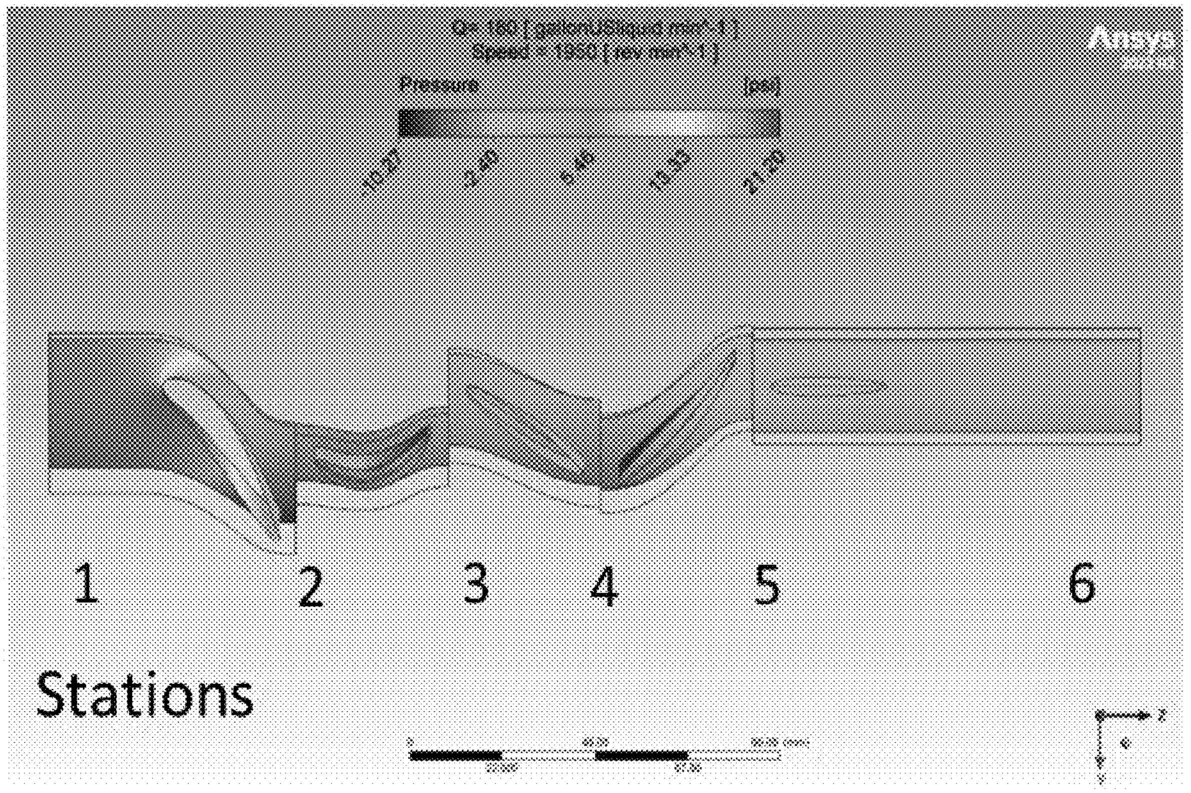
FIG. 4 is a graph of pressure drop contours in a low-thrust turbine.
Figure 5:
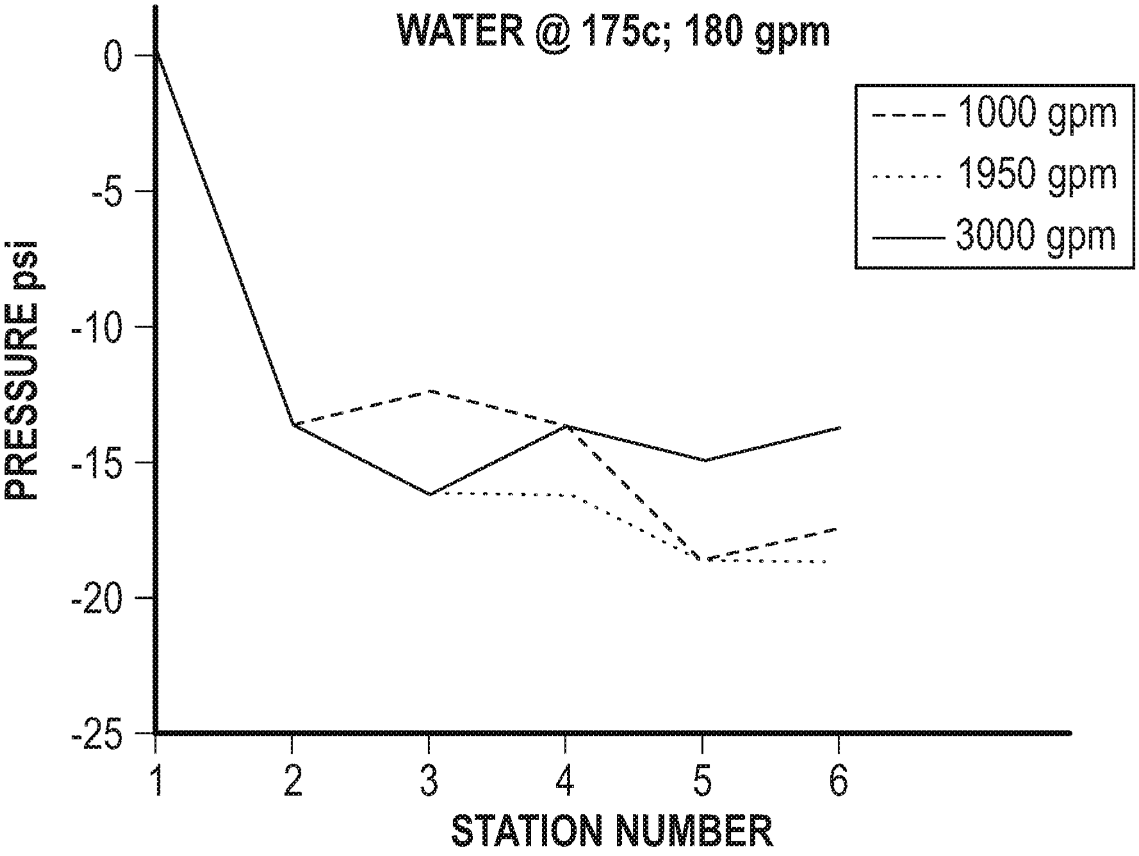
FIG. 5 is a graph of pressure drop in a low-thrust turbine.

FIG. 4 and FIG. 5 show pressure drop contours and their variation along the turbine. The majority of the pressure drop is taken by the first-stage stator 102, which is not contributing to the rotor thrust. Some minor pressure drops are present in the rotor stages 104 and 132, which gradually de-swirl the flow.

Figure 6:
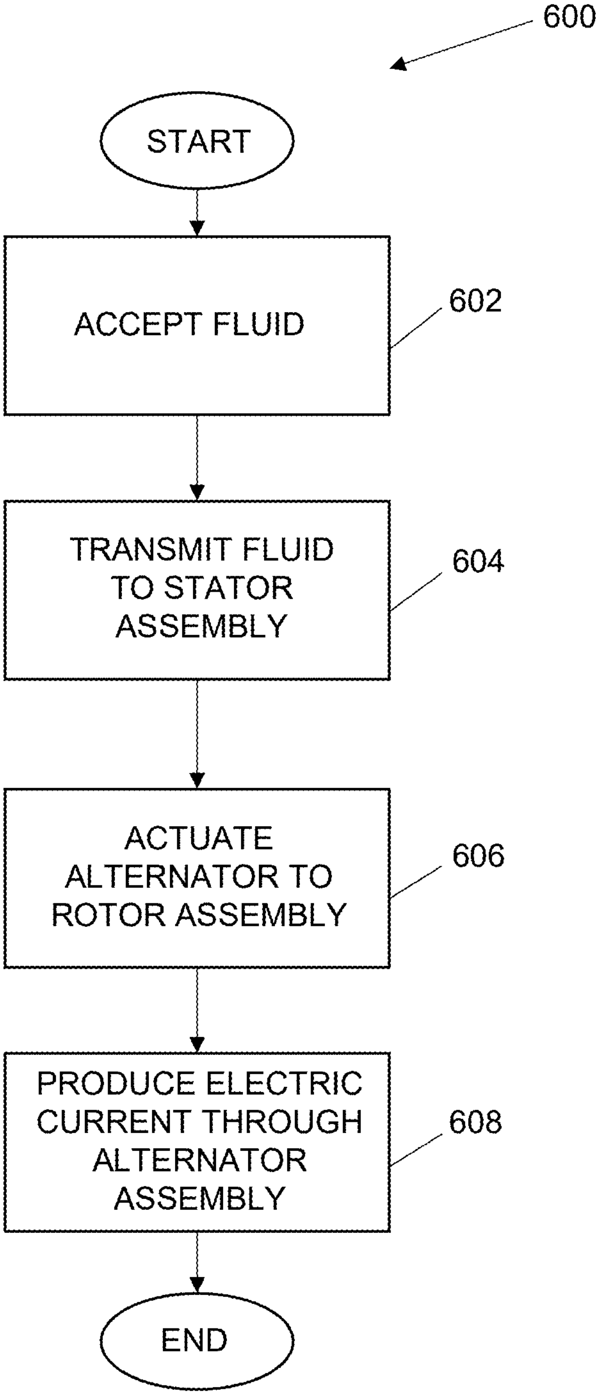
FIG. 6 is a graph of a method in accordance with one example embodiment of the disclosure.

Referring to FIG. 6, a method 600 of generating an electric current in a downhole turbine generator is disclosed. The method 600 may include, at 602, accepting a fluid flow into an inlet 110 of a tubular shape. The method 600 may also include, at 604, transmitting the fluid flow through the tubular shape, wherein the fluid flow passes through a fluid flow passage formed by a stator assembly and a rotor assembly, wherein the rotor assembly is configured to spin, wherein the stator assembly and the rotor assembly are configured such that essentially all thrust loads generated by the fluid flow are transmitted to the stator assembly. The method 600 may also include, at 606, actuating an alternator package 122 through connection to the rotor assembly. The method 600 may also include, at 608, producing the electric current through the actuation of the alternator package 122.

Embodiments of the disclosure may provide for an article of manufacture that contains a non-transitory memory product. The non-transitory memory product may be configured to retain data, such as method steps. The non-transitory memory product may store data and be read by a device. Such devices may be computing devices such as a laptop computer, main frame computer, computer cell phone or other similar device. The method steps may be used, for example, to control a computer or perform mathematical calculations. In turn, the computer may instruct other systems, machines or components. Example non-transitory memory products may include universal serial bus devices, solid state memory arrangements, compact discs, or computer hard drives. In some instances, the non-transitory device may be configured with a device that reads the stored information and transmits the data to a separate location. In some embodiments, artificial intelligence may be used in conjunction with the data stored on the article of manufacture to perform various functions.

Example embodiments of the claims are described. The aspects described should not be considered limiting of the disclosure. In one example embodiment, a downhole power generation turbine is disclosed. The turbine may comprise a tube 108 with an inlet 110 and an outlet 138, the tube 108 defining an interior space 140. The turbine may also comprise a rotor assembly configured within the interior space 140. The turbine may also comprise a bearing package 116 connected to the rotor assembly configured within the interior space 140. The turbine may also comprise a stator assembly configured around the rotor assembly and within the interior space 140, wherein the rotor assembly is configured to rotate within the stator assembly and wherein the rotor assembly and the stator assembly form a fluid pathway 114 such that fluid may progress from the inlet 110 to the outlet 138, and that during the progression of the fluid from the inlet 110 to the outlet 138, mechanical energy of the fluid causes the rotor assembly to rotate, and wherein the stator assembly is physically separated from the rotor assembly so a pressure drop that develops from the fluid passing through the rotor assembly and stator assembly does not contribute to an axial thrust force on the bearing package 116. The turbine may also comprise an alternator package 122 connected to the rotor assembly, the alternator configured to produce an electrical current.

In another example embodiment, the downhole power generation turbine is configured wherein the rotor assembly and the first stage stator assembly are configured such that no radial gap is present.

In another example embodiment, the downhole power generation turbine is configured wherein the turbine is configured as a two-stage turbine 124.

In another example embodiment, the downhole power generation turbine is configured wherein a first stage 126 of the two-stage turbine is an impulse portion and the second stage 128 is a reaction stage.

In another example embodiment, the downhole power generation turbine may further comprise an energy storage system 142 connected to the alternator package 122.

In another example embodiment, the downhole power generation turbine is configured wherein the energy storage system 142 contains at least one battery 144.

In another example embodiment, the downhole power generation turbine may further comprise at least one flow straightener 136 in the turbine.

In another example embodiment, the downhole power generation turbine is configured wherein the at least one flow straightener 136 is at an exit 112 of the turbine.

In another example embodiment, a downhole power generation turbine is disclosed. The turbine may comprise a tube 108 with an inlet 110 and an outlet 138, the tube 108 defining an interior space 140. The turbine may also comprise a rotor assembly configured within the interior space 140. The turbine may also comprise a bearing package 116 connected to the rotor assembly configured within the interior space. The turbine may also comprise a stator assembly configured around the rotor assembly, the stator assembly configured with a first stage stator 102 and a second stage stator 130 and wherein the first stage stator 102 is configured to accept all pressure drop across the turbine and wherein the rotor assembly and the stator assembly form a fluid pathway 114 such that fluid may progress from the inlet 110 to the outlet 138, and that during the progression of the fluid from the inlet 110 to the outlet 138, mechanical energy of the fluid causes the rotor assembly to rotate, and wherein the stator assembly is physically separated from the rotor assembly.

In another example embodiment, the downhole pressure turbine may be configured wherein the turbine is configured so a pressure drop that develops from the fluid passing through the rotor assembly and stator assembly does not contribute to an axial thrust force on the bearing package 116.

In another example embodiment, the downhole pressure turbine may further comprise an alternator package 122 connected to the rotor assembly, the alternator configured to produce an electrical current.

In another example embodiment, the downhole pressure turbine may further comprise an energy storage system 142 connected to the alternator package 122.

In another example embodiment, the downhole pressure turbine may be configured wherein the energy storage system 142 contains at least one battery 144.

In another example embodiment, the downhole power generation turbine may further comprise at least one flow straightener 136 in the turbine.

In another example embodiment, the downhole power generation turbine may be configured wherein at least one flow straightener 136 is at an exit 112 of the turbine.

In another example embodiment, a method of generating an electric current in a downhole turbine generator is disclosed. The method may include accepting a fluid flow into an inlet 110 of a tubular shape. The method may also include transmitting the fluid flow through the tubular shape, wherein the fluid flow passes through a fluid flow passage formed by a stator assembly and a rotor assembly, wherein the rotor assembly is configured to spin, wherein the stator assembly and the rotor assembly are configured such that essentially all thrust loads generated by the fluid flow are transmitted to the stator assembly. The method may also include actuating an alternator package 122 through connection to the rotor assembly. The method may also include producing the electric current through the actuation of the alternator package 122.

In another example embodiment, the method may further comprise charging at least one battery 144 from the produced electric current.

In another example embodiment, the method may be performed wherein the turbine generator is configured as a two-stage turbine generator 124.

Further embodiments may include methodologies that allow computers to be trained to allow for more comprehensive and accurate answers. Such training may be performed in nodes that may be used to allow for fine tuning of results. Upon retention of results of calculations, the method steps may be altered such that results that are not accurate are precluded from future calculations by amending method steps accomplished in various nodes. Such alterations are contemplated and are within the scope of this disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A downhole power generation turbine, comprising:

a tube with an inlet and an outlet, the tube defining an interior space;

a rotor assembly configured within the interior space;

a bearing package connected to the rotor assembly configured within the interior space;

a stator assembly configured around the rotor assembly and within the interior space, wherein the rotor assembly is configured to rotate within the stator assembly, wherein the rotor assembly and the stator assembly form a fluid pathway such that fluid may progress from the inlet to the outlet, and during the progression of the fluid from the inlet to the outlet, mechanical energy of the fluid causes the rotor assembly to rotate, wherein the stator assembly is physically separated from the rotor assembly so a pressure drop that develops from the fluid passing through the rotor assembly and the stator assembly reduces a contribution to an axial thrust force on the bearing package, wherein at least a portion of the fluid is passed along the bearing package, wherein the bearing package comprises a first half of the bearing package that is connected to the rotor assembly distinct from the stator assembly and a second half of the bearing package that is connected to the stator assembly distinct from the rotor assembly, wherein the at least a portion of the fluid lubricates the first half of the bearing package and the second half of the bearing package; and an alternator package connected to the rotor assembly, the alternator package configured to produce an electrical current.

2. The downhole power generation turbine according to claim 1, wherein the rotor assembly and the stator assembly are configured such that no radial gap is present upstream of the stator assembly.

3. The downhole power generation turbine according to claim 1, wherein the downhole power generation turbine is configured as a two-stage turbine.

4. The downhole power generation turbine according to claim 3, wherein a first stage of the two-stage turbine is an impulse portion and a second stage is a reaction stage.

5. The downhole power generation turbine according to claim 1, further comprising an energy storage system connected to the alternator package.

6. The downhole power generation turbine according to claim 5, wherein the energy storage system contains at least one battery.

7. The downhole power generation turbine according to claim 1, further comprising at least one flow straightener in the downhole power generation turbine.

8. The downhole power generation turbine according to claim 7, wherein the at least one flow straightener is at an exit of the downhole power generation turbine.

9. The downhole power generation turbine according to claim 1, wherein the stator assembly is configured within the rotor assembly, wherein the rotor assembly rotates around the stator assembly.

10. A downhole power generation turbine, comprising:

a tube with an inlet and an outlet, the tube defining an interior space;

a rotor assembly configured within the interior space;

a bearing package connected to the rotor assembly configured within the interior space; and a stator assembly configured around the rotor assembly, the stator assembly configured with a first stage stator and a second stage stator, wherein the first stage stator is configured to accept all pressure drop across the downhole power generation turbine, wherein the rotor assembly and the stator assembly form a fluid pathway, such that fluid may progress from the inlet to the outlet, and during the progression of the fluid from the inlet to the outlet, mechanical energy of the fluid causes the rotor assembly to rotate, wherein at least a portion of the fluid is passed along the bearing package, wherein the stator assembly is physically separated from the rotor assembly, wherein a first half of the bearing package is connected to the rotor assembly distinct from the stator assembly and a second half of the bearing package is connected to the stator assembly distinct from the rotor assembly, wherein the at least a portion of the fluid lubricates the first half of the bearing package and the second half of the bearing package.

11. The downhole power generation turbine according to claim 10, wherein the downhole power generation turbine is configured so a pressure drop that develops from the fluid passing through the rotor assembly and the stator assembly reduces a contribution to an axial thrust force on the bearing package.

12. The downhole power generation turbine according to claim 10, further comprising an alternator package connected to the rotor assembly, the alternator package configured to produce an electrical current.

13. The downhole power generation turbine according to claim 12, further comprising an energy storage system connected to the alternator package.

14. The downhole power generation turbine according to claim 13, wherein the energy storage system contains at least one battery.

15. The downhole power generation turbine according to claim 10, further comprising at least one flow straightener in the downhole power generation turbine.

16. The downhole power generation turbine according to claim 15, wherein the at least one flow straightener is at an exit of the downhole power generation turbine.

17. The downhole power generation turbine according to claim 10, wherein the stator assembly is configured within the rotor assembly, wherein the rotor assembly is configured to rotate around the stator assembly.

18. A method of generating an electric current in a downhole turbine generator, comprising:

accepting a fluid flow into an inlet of a tubular shape;

transmitting the fluid flow through the tubular shape, wherein the fluid flow passes through a fluid flow passage formed by a stator assembly and a rotor assembly, wherein the rotor assembly is configured to spin, wherein the stator assembly and the rotor assembly are configured such that essentially all thrust loads generated by the fluid flow are transmitted to the stator assembly, wherein at least a portion of the fluid flow is passed along a bearing package comprising a first half of the bearing package connected to the rotor assembly distinct from the stator assembly and a second half of the bearing package connected to the stator assembly distinct from the rotor assembly, wherein the at least a portion of the fluid flow lubricates the first half of the bearing package and the second half of the bearing package;

actuating an alternator package through connection to the rotor assembly; and producing the electric current through the actuation of the alternator package.

19. The method according to claim 18, further comprising charging at least one battery from the produced electric current.

20. The method according to claim 18, wherein the downhole turbine generator is configured as a two-stage turbine generator.

* * * * *